(12) United States Patent
Zhang (10) Patent No.: US 11,719,477 B2
(45) Date of Patent: Aug. 8, 2023

(54) VARIABLE SPEED COMPRESSOR BASED AC SYSTEM AND CONTROL METHOD

(71) Applicant: ECOER INC., Mclean, VA (US)

(72) Inventor: Jianliang Zhang, Beijing (CN)

(*) Notice: Subject to any disclaimer, the term of this patent is extended or adjusted under 35 U.S.C. 154(b) by 72 days.

(21) Appl. No.: 16/468,822

(22) PCT Filed: Dec. 29, 2016

(86) PCT No.: PCT/US2016/069345
§ 371 (c)(1),
(2) Date: Jun. 12, 2019

(87) PCT Pub. No.: WO2018/125171
PCT Pub. Date: Jul. 5, 2018

(65) Prior Publication Data
US 2020/0072520 A1    Mar. 5, 2020

(51) Int. Cl.
*F25B 49/02* (2006.01)
*G05B 13/04* (2006.01)

(52) U.S. Cl.
CPC .......... *F25B 49/022* (2013.01); *G05B 13/042* (2013.01); *F25B 2600/0253* (2013.01); *F25B 2700/151* (2013.01); *F25B 2700/171* (2013.01); *F25B 2700/1931* (2013.01); *F25B 2700/1933* (2013.01); *F25B 2700/2106* (2013.01)

(58) Field of Classification Search
CPC ............ F25B 49/022; F25B 2600/0253; F25B 2700/151; F25B 2700/171; F25B 2700/1931; F25B 2700/1933; F25B 2700/2106; F25B 13/00; G05B 13/042; Y02B 30/70
See application file for complete search history.

(56) References Cited

U.S. PATENT DOCUMENTS

| | | | | |
|---|---|---|---|---|
| 4,574,871 A | * | 3/1986 | Parkinson | .......... G05D 23/1917 165/11.1 |
| 5,022,234 A | * | 6/1991 | Goubeaux | ............. F25B 49/022 236/78 D |
| 2008/0264080 A1 | * | 10/2008 | Creed | ................... F25B 49/025 62/132 |
| 2015/0082814 A1 | * | 3/2015 | Kim | ...................... F25B 49/025 62/56 |
| 2015/0114080 A1 | * | 4/2015 | Berg | ..................... G01L 19/086 73/1.57 |

* cited by examiner

*Primary Examiner* — Larry L Furdge
(74) *Attorney, Agent, or Firm* — John Ye (57) ABSTRACT

The present disclosure relates to the field of air conditioning technology. In particular, it involves a control method and control system based on a variable speed AC compressor.

10 Claims, 11 Drawing Sheets

VARIABLE SPEED COMPRESSOR BASED AC SYSTEM AND CONTROL METHOD

The present application is a national stage of PCT/US2016/069345, filed on Dec. 29, 2016, with its specification incorporated by reference, but otherwise the same. The disclosure below will assume common knowledge of air conditioning and heat pump as well as their heat exchange principle in terms of achieving cooling and heating. Therefore, when discussing particular AC inner working, it is applied to heat pump collectively. The discussion will also treat compressor speed and compressor RPS (rotation per second) interchangeably as well.

BACKGROUND OF THE DISCLOSURE

With the development of air-conditioning technology, variable speed air conditioner is becoming mainstream product because it is energy efficient, low noise and good thermostatic, etc. Conventional variable speed air conditioner generally includes an indoor unit, an outdoor unit and a thermostat. When working normally, the variable speed outdoor unit receives the required switch signal from the indoor unit or the thermostat. Also received are set temperature, indoor temperature and other signals. The system generally uses the indoor vs. outdoor temperature difference, and the rate of change of this difference to determine the indoor cooling load. Based on the load requirement, it calculates the needed speed of the compressor. From this simple construction, we can see that unless there is constant multi-parameter communication with the indoor unit or thermostat, the conventional variable speed air conditioner is unable to obtain an accurate speed for the outdoor unit to match the load.

On the other hand, because existing fixed-speed AC unit has only one on/off switch communication between the outdoor unit and the indoor unit or the thermostat, in order to upgrade the existing fixed-speed AC unit to a variable speed unit, it means not only the variable speed compressor needs to be new, but also the indoor unit or thermostat will need to be compatible and new. Therefore, upgrading everything becomes the reason for increased costs and difficulty in installation.

SUMMARY OF THE DISCLOSURE

Based on the above deficiencies, an objective of the disclosure is to provide a new control system and method implementation, so that this new implementation will solve the deficiencies in upgrading to a variable speed AC system. The reengineered part of the system implementation is by self-learning the indoor load, in order to achieve precise output matching control on the variable speed AC system. This would be done all without the need to obtain the room temperature and the set temperature, which is fully compatible with the existing fixed speed AC control system. It is fully compatible because under the existing on and off signaling mechanism, the outdoor variable speed AC compressor can still provide accurate speed adjustment.

To achieve the above objective in matching the variable speed compressor AC unit with the load, a control system of the present disclosure can be used. It is comprised of: a speed control calculation unit, a data storage unit, and an information acquisition unit.

As the speed control calculation unit, it is for setting an initial target speed of the compressor based on current outdoor temperature and default compressor run time t. After achieving the initial target speed, the speed control calculation unit readjusts the speed by $\Delta F$ based on the compressor current change of $\Delta I$, refrigerant high pressure change of $\Delta Pc$, refrigerant low pressure change of $\Delta Pe$, as well as the change of time $\Delta t$ since compressor is on.

As the data storage unit, it is for storing data from actual compressor cycle, the compressor on timing t', the average outdoor temperature and the average compressor speed. In addition, the data storage unit stores the compressor regression model parameters on compressor current change of $\Delta I$ as $A_1$, refrigerant high pressure change of $\Delta Pc$ as $A_2$, refrigerant low pressure change of $\Delta Pe$ as $A_3$, as well as the change of time $\Delta t$ since compressor is on as $A_4$. Moreover, the data storage unit provides to the speed control calculation unit those data.

As the information acquisition unit, it is for collecting sensor data generated by the outdoor unit, including the outdoor temperature, outdoor unit high/low pressure saturation temperatures, compressor speed, compressor current, compressor high pressure Pc and compressor low pressure Pe.

To achieve the aforementioned load matching, a new speed control method in the present disclosure comprises:
a. receiving default setting of run time t, and the compressor regression model parameters on compressor current change of $\Delta I$ as $A_1$, refrigerant high pressure change of $\Delta Pc$ as $A_2$, refrigerant low pressure change of $\Delta Pe$ as $A_3$, as well as the change of time $\Delta t$ since compressor is on as $A_4$;
b. based on the outdoor temperature and the default run time t, setting a target compressor speed;
c. running compressor until the target compressor speed is achieved, then running it one speed control timing cycle;
d. based on only compressor current change of $\Delta I$, calculating the value of this parameter that either would favor increase speed or decrease speed;
e. based on only refrigerant high pressure change of $\Delta Pc$, calculating the value of this parameter that either would favor increase speed or decrease speed;
f. based on only refrigerant low pressure change of $\Delta Pe$, calculating the value of this parameter that either would favor increase speed or decrease speed;
g. when the current time has not reached the target run time t, then adding up all the favorable values of the parameters of $A_1$, $A_2$ and $A_3$ that would increase compressor speed, as well as adding up all the favorable values of the parameters that would decrease compressor speed, and based on the increase of compressor speed sum value>decrease of compressor speed sum value, setting the compressor value higher—or lower conversely;
h. when the current time has reached the target run time t, then adding up all the favorable values of the parameters of $A_1$, $A_2$, $A_3$ and $A_4$ that would increase compressor speed ($A_4$ being a parameter always favors increasing speed), as well as adding up all the favorable values of the parameters that would decrease compressor speed, and based on the increase of compressor speed sum value>decrease of compressor speed sum value, setting the compressor value higher—or lower conversely;
i. running the compressor one speed control timing cycle before returning to step d;
j. when receiving compressor off signal, recording the actual compressor on time of t', actual average outdoor temperature and actual average speed from the compressor on period into data storage unit for self-learning purpose, and denoting that when t'≤t, the actual speed as "adequate", or "inadequate" when t'>t;

k. further processing the multiple events on speed setting within a given temperature in the data storage, so that statistically, when actual speed "adequate" occurrence>"inadequate" occurrence, decreasing the default speed for a given temperature by default X, or increasing conversely.

The load matching principle of this disclosure is based on higher the compressor speed, higher the cooling/heating system output capacity, and the fact that if the system output outpaces the cooling/heating need, it would cause frequent start/stop, and waste electricity as a result. Therefore, as both a comfort factor and saving factor, this disclosure explains how the multi-factors, namely, compressor current change of $\Delta I$, refrigerant high pressure change of $\Delta Pc$, refrigerant low pressure change of $\Delta Pe$, as well as the change of time $\Delta t$ since compressor is on, are related to the goal of self-learning in order to optimize the speed to achieve comfort and saving though eliminating the frequent system start/stop.

DETAILED DESCRIPTION OF THE DISCLOSURE

First Embodiment

Figure 1:
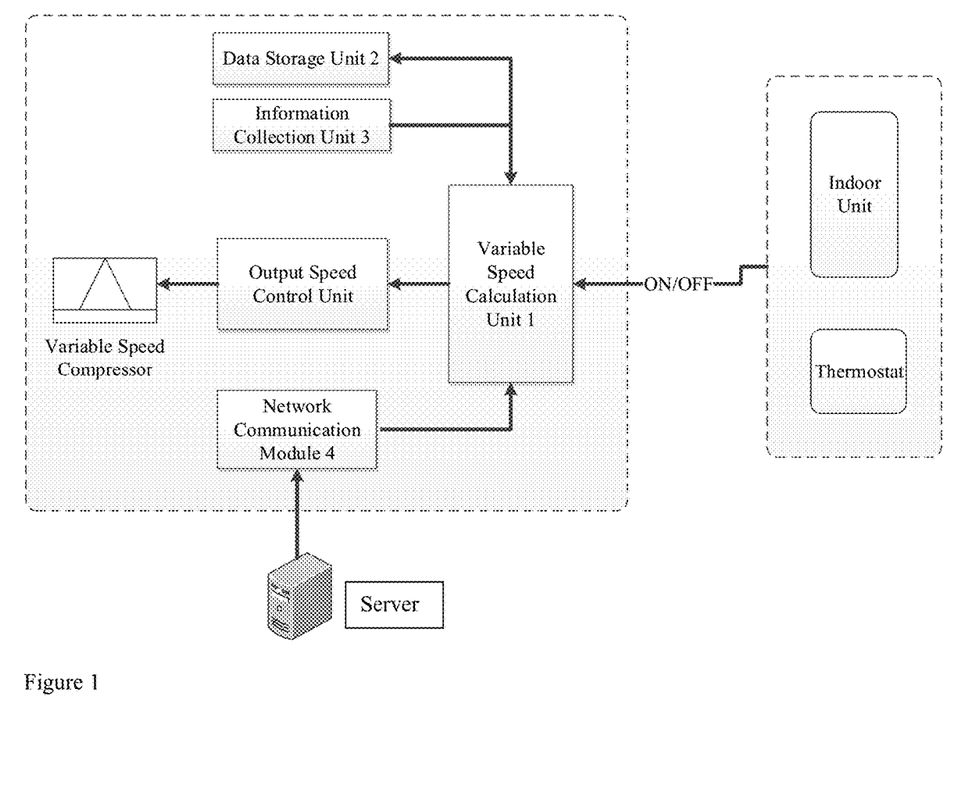
FIG. 1 shows a system diagram of the new variable AC unit implementation of this disclosure.

FIG. 1 is the variable speed AC control system configuration diagram of the first embodiment, comprises: speed control calculation unit 1, database unit 2, operation data acquisition unit 3 and network communication module 4, wherein the speed control calculation unit 1 is for setting an initial target speed of the compressor based on current outdoor temperature and default compressor run time t, and after achieving the initial target speed, readjusting the speed; and database unit 2, for storing and providing from actual compressor cycle, the compressor on timing t', the average outdoor temperature and the average compressor speed, which are needed by the speed control calculation unit 1 when starting; and the operation data acquisition unit 3, for collecting sensor data generated by the outdoor unit, including the outdoor temperature, outdoor unit high/low pressure saturation temperatures, compressor speed, compressor current; and the network communication unit 4 is used to get weather forecasts results from a remote server, used to obtain in advance ambient temperature.

This embodiment works on estimating the relationship on how the changing compressor current I affects the changing indoor temperature, and based on the estimation, adjust the compressor speed.

Figure 2:
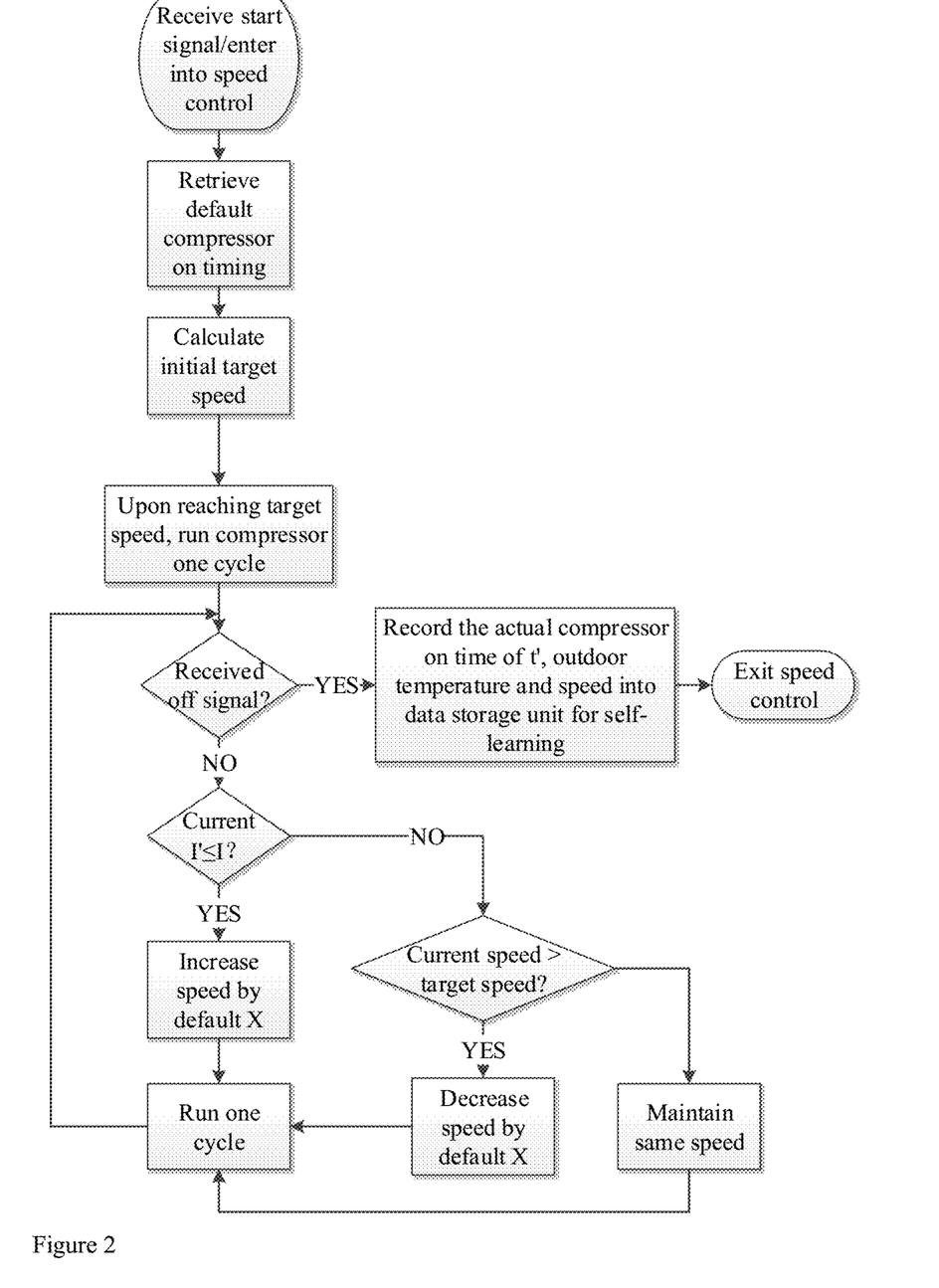
FIG. 2 shows a flow diagram in cooling mode of the new variable AC unit implementation of a first embodiment of this disclosure.

FIG. 2 shows flow diagram of a new fuzzy control method in cooling mode of the present disclosure, comprises:
a. receiving default setting of run time t;
b. based on the outdoor temperature and the default run time t, setting a target compressor speed;
c. running compressor until the target compressor speed is achieved, then running it one speed control timing cycle;
d. comparing the present compressor current I and that (I') from the prior speed control timing cycle, if I'≤I, meaning the indoor temperature has not decreased, then increasing the compressor speed by a default value X, but if on the other hand, I'>I, meaning the indoor temperature has decreased, then further testing whether the current speed>default speed, in order to decrease the current speed by default value X if so, or leave the current speed unchanged if not;
e. running the compressor one speed control timing cycle before returning to step d;
f. when receiving compressor off signal, recording the actual compressor on time of t', actual average outdoor temperature and actual average speed from the compressor on period into data storage unit for self-learning purpose.

Default Runtime t Determination

The default compressor on time t can be set according to user's preference. But it can also be set by a remote server. Also, t can be calculated based on a fixed compressor power.

Default Compressor Speed Adjustment Increment X

In this embodiment, the default compressor speed adjustment increment X can be set according to user's preference. But it can also be set by a remote server. The effect of this value being large is to speed up the compressor speed adjustment in order to search a stable compressor speed. But the abrupt temperature change can become uncomfortable to the users. Therefore, this value can be set smaller if that is the case. On the other hand, setting this value small can prolong the search for the stable compressor speed.

Compressor Speed Adjustment Cycle Timing

The compressor speed adjustment timing can be set by the users or by a remote server so the compressor speed can be adjusted—e.g. every 120 seconds.

Self-Learning by Average Outdoor Temperature and Compressor Speed

In the self-learning process, the average outdoor temperature can be calculated by weighted method. For example, when compressor on timing is 50 min, during which temperatures were at 33° for 15 min, 34° for 30 min, and 35° for 5 min, then the average temperature is (15/50)×33°+(30/50)×34°+(5/50)×35°=33.8°. Similarly, average compressor speed during 50 min runtime for the sequence of 50 Hz for 10 min, 48 Hz for 30 min and 46 Hz for 10 min is: (10/50)×50 Hz+(30/50)×48 Hz+(10/50)×46 Hz=48 Hz.

Figure 3:
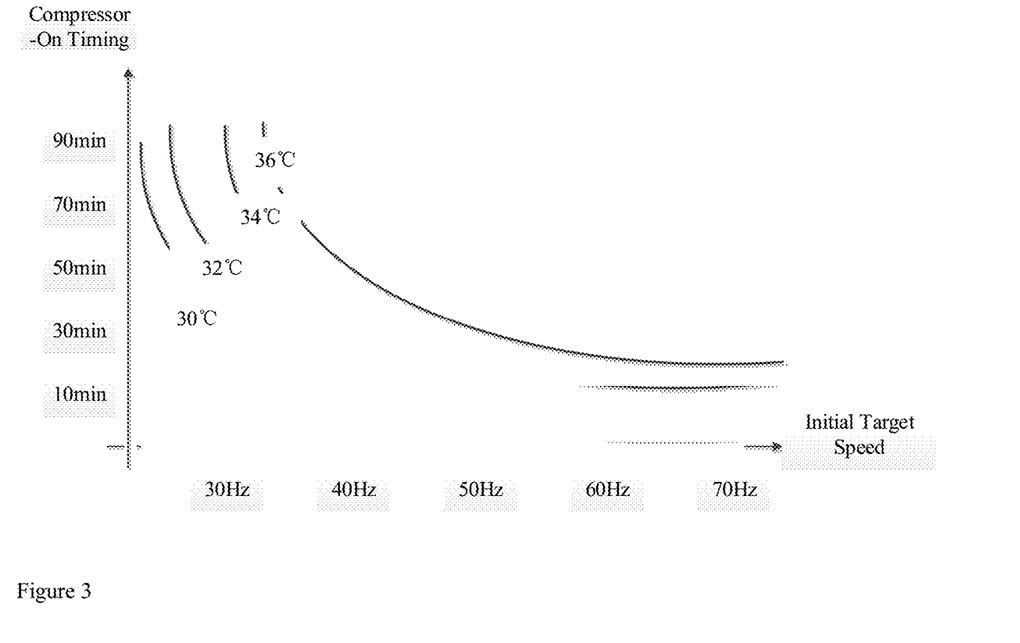
FIG. 3 shows several control plots created by the new variable AC control unit through self-learning in the first embodiment of this disclosure.

In this embodiment, based on fuzzy control method, and after accumulating enough test runs for self-learning, FIG. 3 shows the plots from the data. Every time when the compressor starts, looking up from the plots, one can determine the target compressor speed.

However, because the compressor stop signal can be triggered by the user, not because after the desired temperature has been achieved, in such situation, the learned runtime average temperature/compressor on timing/average compressor speed relationship would not be accurate. For this particular data set, its effect can be offset by taking an average from all the observed data sets, or be eliminated by excluding the unreliable dataset. For example, when running under speed of 48 RPS, timings of 40 min, 50 min, 60 min, 55 min and 65 min can be averaged to offset the chance when one of them was caused by user's shut off.

Figure 4:
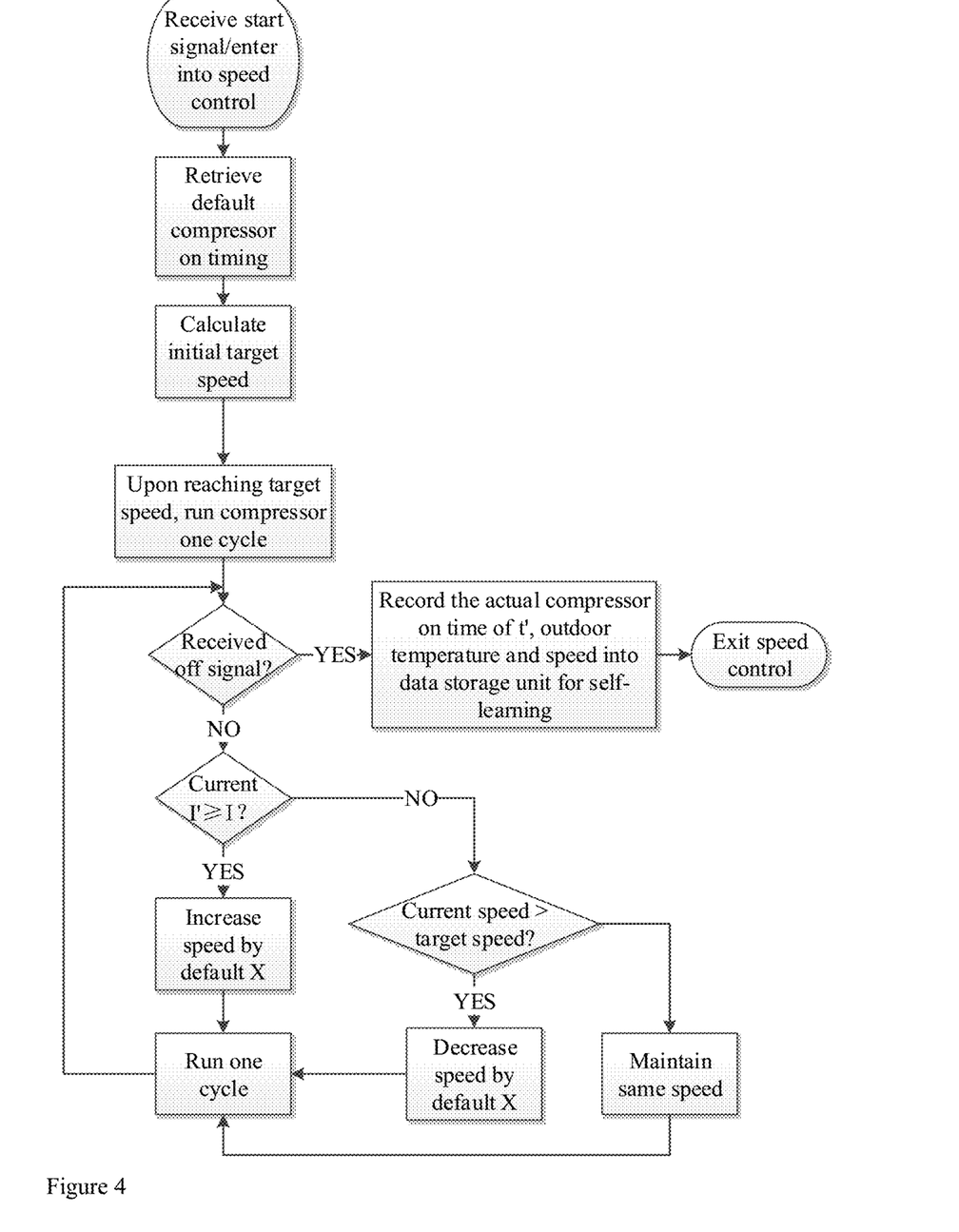
FIG. 4 shows a flow diagram in heating mode of the new variable AC unit implementation of the first embodiment of this disclosure.

FIG. 4 shows flow diagram of a new fuzzy control method in heating mode of the present disclosure, comprises:
a. receiving default setting of run time t;
b. based on the outdoor temperature and the default run time t, setting a target compressor speed;
c. running compressor until the target compressor speed is achieved, then running it one speed control timing cycle;
d. comparing the present compressor current I and that (I') from the prior speed control timing cycle, if I'≥I, meaning the indoor temperature has not increased, then increasing the compressor speed by a default value X, but if on the other hand, I'<I, meaning the indoor temperature has increased, then further testing whether the current speed>default speed, in order to decrease the current speed by default value X if so, or leave the current speed unchanged if not;
e. running the compressor one speed control timing cycle before returning to step d;
f. when receiving compressor off signal, recording the actual compressor on time of t', actual average outdoor temperature and actual average speed from the compressor on period into data storage unit for self-learning purpose.

Second Embodiment

Similar to the first embodiment, this embodiment works on estimating the relationship on how the changing compressor high pressure Pc affects the changing indoor temperature, and based on the estimation, adjust the compressor speed.

Figure 5:
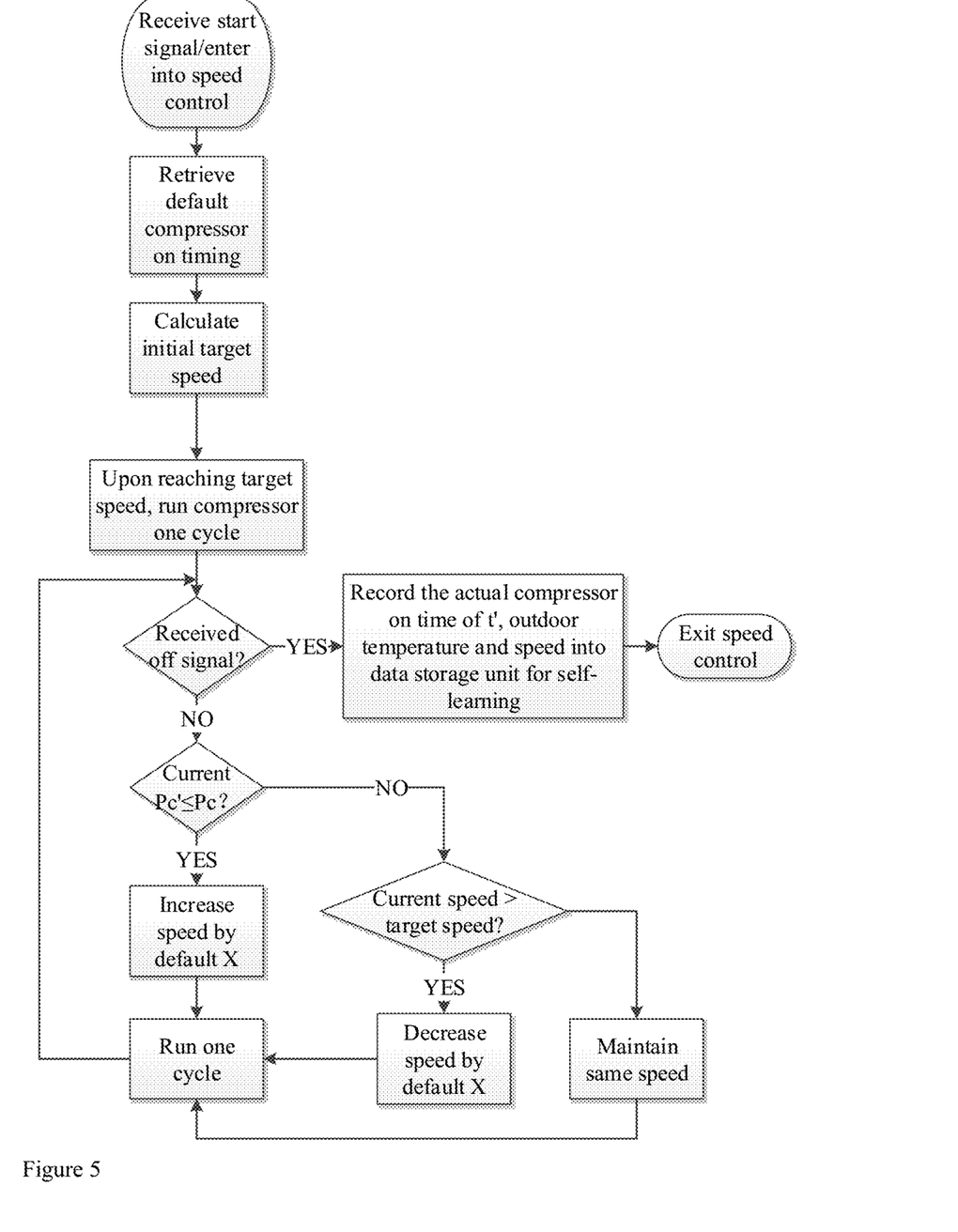
FIG. 5 shows a flow diagram in cooling mode of the new variable AC unit implementation of a second embodiment of this disclosure.

FIG. 5 shows a flow diagram of a new fuzzy control method in cooling mode of the present disclosure comprises:
a. receiving default setting of run time t;
b. based on the outdoor temperature and the default run time t, setting a target compressor speed;
c. running compressor until the target compressor speed is achieved, then running it one speed control timing cycle;
d. comparing the present compressor high pressure Pc and that (Pc') from the prior speed control timing cycle, if Pc'≤Pc, meaning the indoor temperature has not decreased, then increasing the compressor speed by a default value X, but if on the other hand, Pc'>Pc, meaning the indoor temperature has decreased, then further testing whether the current speed>default speed, in order to decrease the current speed by default value X if so, or leave the current speed unchanged if not;
e. running the compressor one speed control timing cycle before returning to step d;
f. when receiving compressor off signal, recording the actual compressor on time of t', actual average outdoor temperature and actual average speed from the compressor on period into data storage unit for self-learning purpose.

Figure 6:
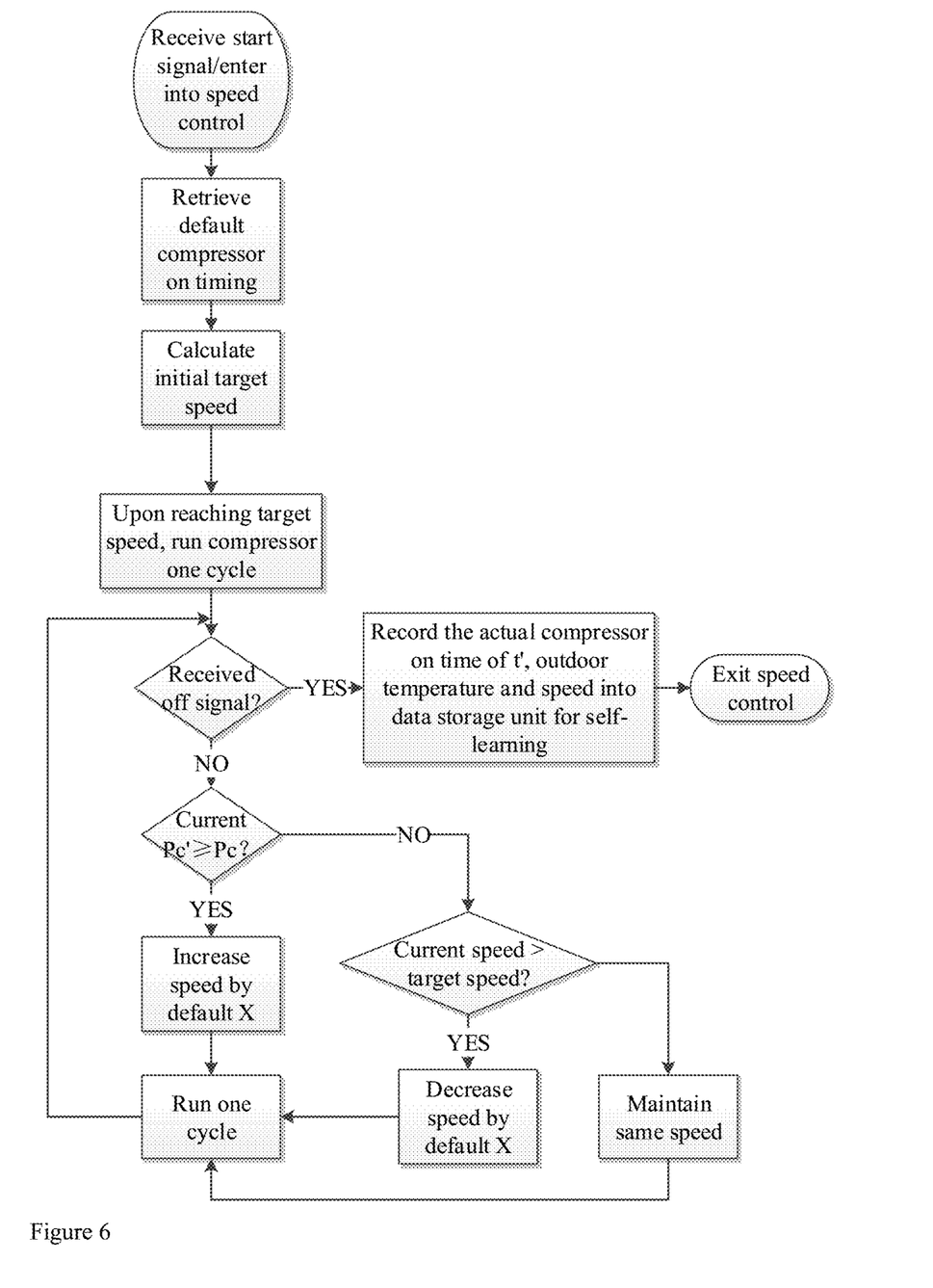
FIG. 6 shows a flow diagram in heating mode of the new variable AC unit implementation of the second embodiment of this disclosure.

FIG. 6 shows a flow diagram of a new fuzzy control method in heating mode of the present disclosure, comprises:
a. receiving default setting of run time t;
b. based on the outdoor temperature and the default run time t, setting a target compressor speed;
c. running compressor until the target compressor speed is achieved, then running it one speed control timing cycle;
d. comparing the present high pressure Pc and that (Pc') from the prior speed control timing cycle, if Pc'≥Pc, meaning the indoor temperature has not increased, then increasing the compressor speed by a default value X, but if on the other hand, Pc'<Pc, meaning the indoor temperature has increased, then further testing whether the current speed>default speed, in order to decrease the current speed by default value X if so, or leave the current speed unchanged if not;
e. running the compressor one speed control timing cycle before returning to step d;
f. when receiving compressor off signal, recording the actual compressor on time of t', actual average outdoor temperature and actual average speed from the compressor on period into data storage unit for self-learning purpose.

Third Embodiment

Similar to the second embodiment, this embodiment works on estimating the relationship on how the changing compressor low pressure Pe affects the changing indoor temperature, and based on the estimation, adjust the compressor speed.

Figure 7:
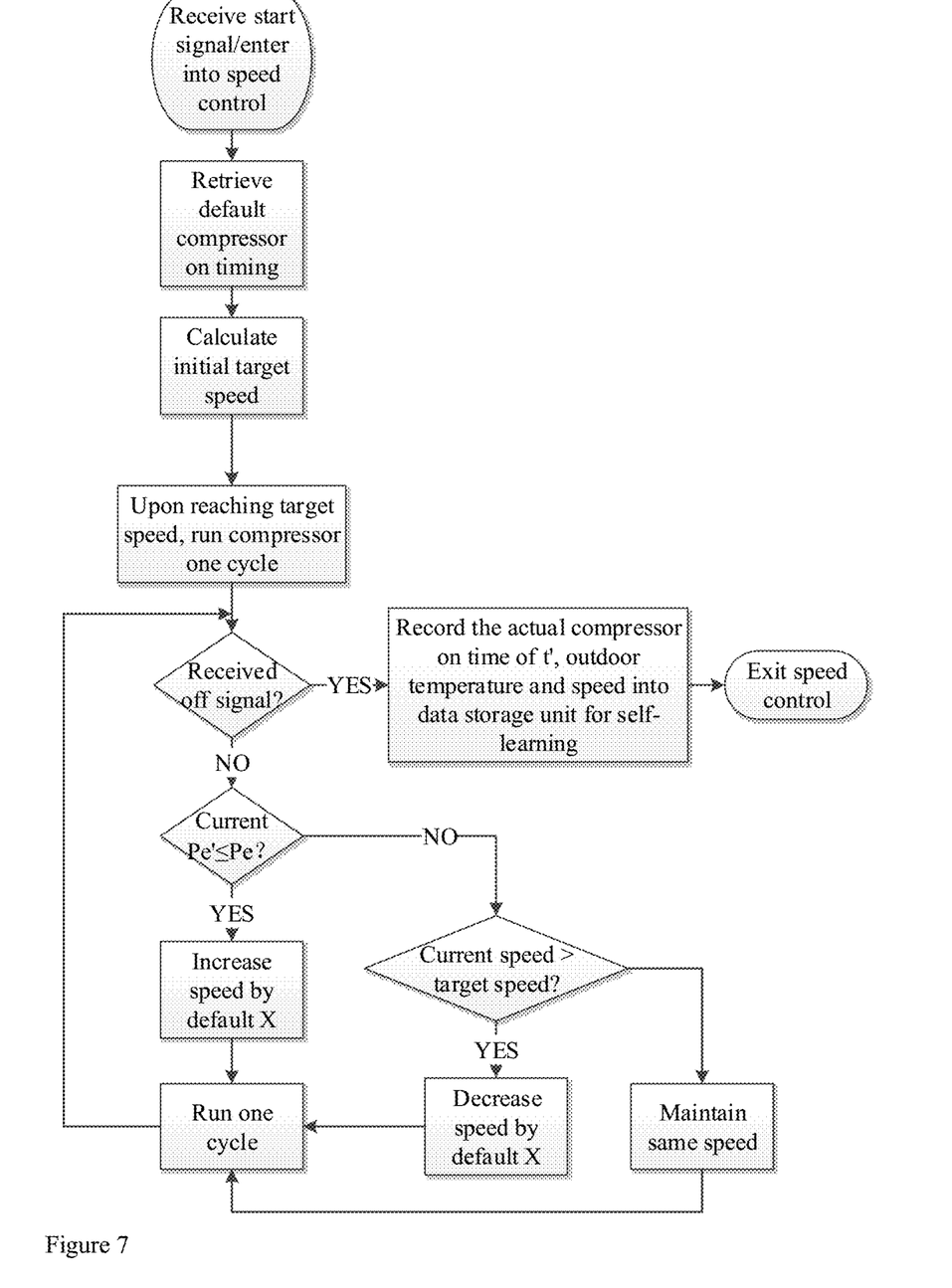
FIG. 7 shows a flow diagram in cooling mode of the new variable AC unit implementation of a third embodiment of this disclosure.

FIG. 7 shows a flow diagram of a new fuzzy control method in cooling mode of the present disclosure comprises:
a. receiving default setting of run time t;
b. based on the outdoor temperature and the default run time t, setting a target compressor speed;
c. running compressor until the target compressor speed is achieved, then running it one speed control timing cycle;
d. comparing the present compressor high pressure Pe and that (Pe') from the prior speed control timing cycle, if Pe'≤Pe, meaning the indoor temperature has not decreased, then increasing the compressor speed by a default value X, but if on the other hand, Pe'>Pe, meaning the indoor temperature has decreased, then further testing whether the current speed>default speed, in order to decrease the current speed by default value X if so, or leave the current speed unchanged if not;
e. running the compressor one speed control timing cycle before returning to step d;
f. when receiving compressor off signal, recording the actual compressor on time of t', actual average outdoor temperature and actual average speed from the compressor on period into data storage unit for self-learning purpose.

Figure 8:
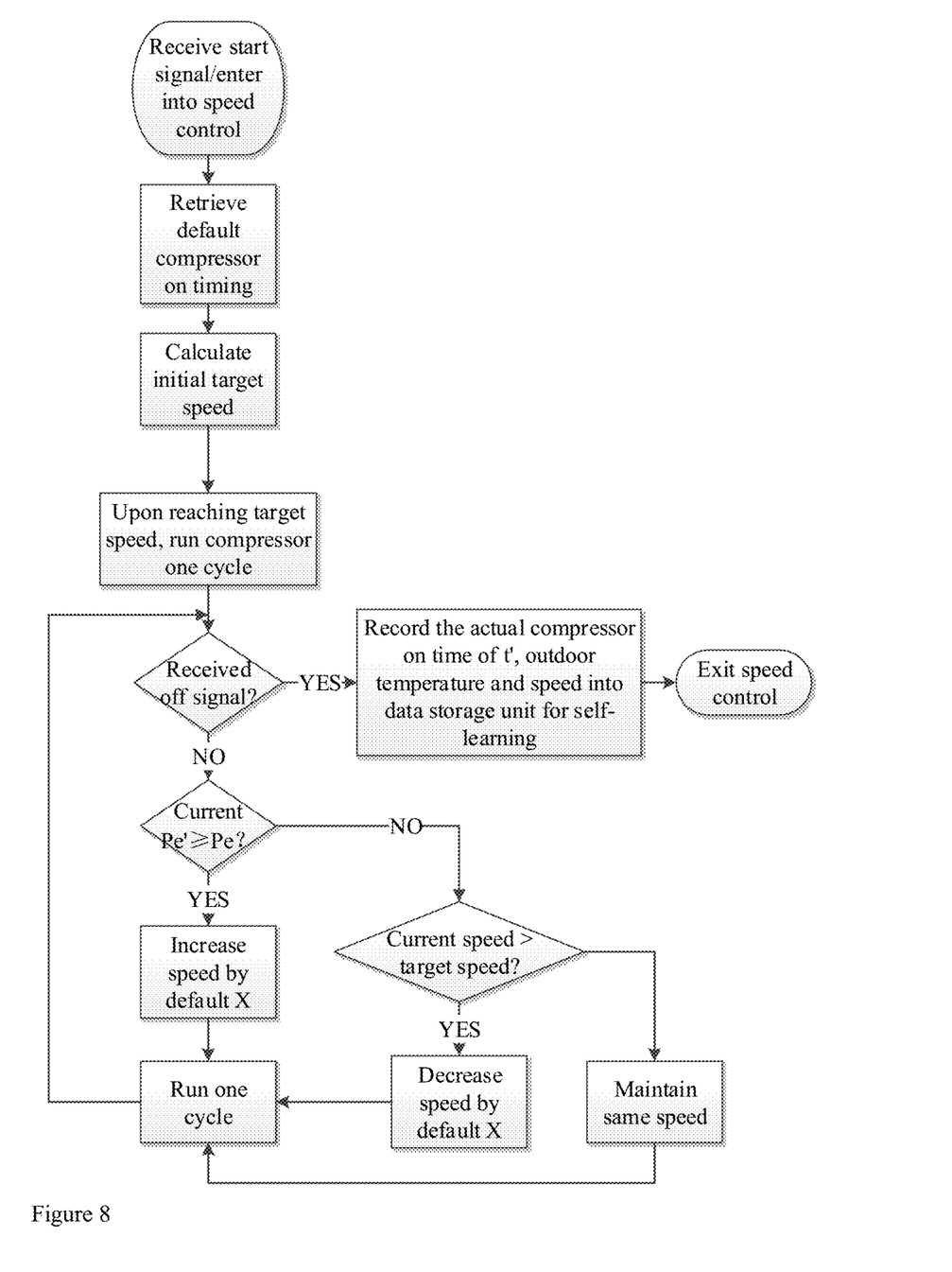
FIG. 8 shows a flow diagram in heating mode of the new variable AC unit implementation of the third embodiment of this disclosure.

FIG. 8 shows a flow diagram of a new fuzzy control method in heating mode of the present disclosure, comprises:
a. receiving default setting of run time t;
b. based on the outdoor temperature and the default run time t, setting a target compressor speed;

c. running compressor until the target compressor speed is achieved, then running it one speed control timing cycle;
d. comparing the present high pressure Pe and that (Pe') from the prior speed control timing cycle, if Pe'≥Pe, meaning the indoor temperature has not increased, then increasing the compressor speed by a default value X, but if on the other hand, Pe'<Pe, meaning the indoor temperature has increased, then further testing whether the current speed>default speed, in order to decrease the current speed by default value X if so, or leave the current speed unchanged if not;
e. running the compressor one speed control timing cycle before returning to step d;
f. when receiving compressor off signal, recording the actual compressor on time of t', actual average outdoor temperature and actual average speed from the compressor on period into data storage unit for self-learning purpose.

Fourth Embodiment

In this embodiment, in addition to the similar routine shown in prior embodiments, specific finding of actual speed as "adequate" or "inadequate" would be collected into the data set.

Figure 9:
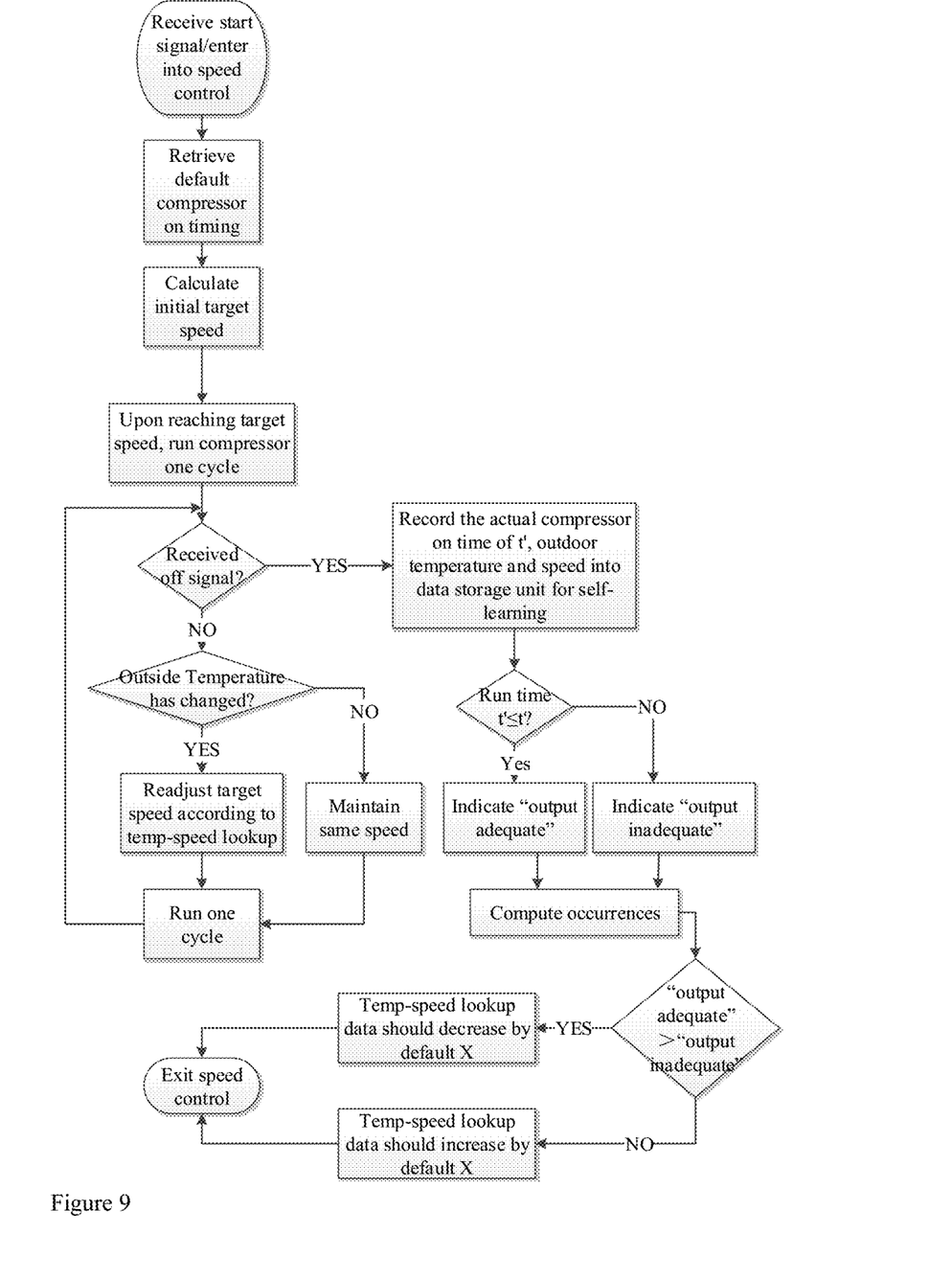
FIG. 9 shows a flow diagram the new variable AC unit implementation of a fourth embodiment of this disclosure.

FIG. 9 shows a flow diagram of a new fuzzy control method in the present disclosure comprises:
a. receiving default setting of run time t;
b. based on the outdoor temperature and the default run time t, setting a target compressor speed;
c. running compressor until the target compressor speed is achieved, then running it one speed control timing cycle;
d. on outdoor temperature change, based on temp-speed lookup data, adjust compressor speed;
e. when receiving compressor off signal, recording the actual compressor on time of t', actual average outdoor temperature and actual average speed from the compressor on period into data storage unit for self-learning purpose, and denote that when t'≤t, the actual speed as "adequate", or "inadequate" when t'>t.
f. further processing the multiple events on speed setting within a given temperature in the data storage, so that statistically, when actual speed "adequate" occurrence>"inadequate" occurrence, decrease the default speed for a given temperature by default X, or increase conversely.

Figure 10:
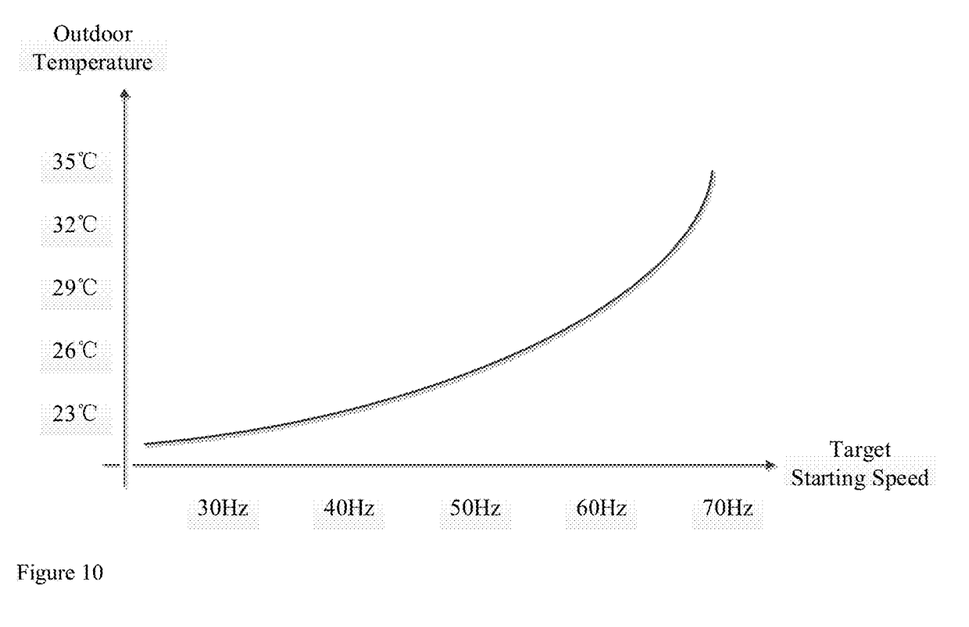
FIG. 10 shows a control plot created by the new variable AC control unit through self-learning in the fourth embodiment of this disclosure.

FIG. 10 shows a plot of temperature vs. target starting speed from enough data points generated by the new fuzzy control method and after statistical modification based on "adequate" and "inadequate" occurrence.

Fifth Embodiment

In this embodiment, in addition to the similar routine shown in prior embodiments, a combined compressor current change of $\Delta I$, refrigerant high pressure change of $\Delta Pc$, refrigerant low pressure change of $\Delta Pe$, as well as the change of time $\Delta t$ since compressor is on, are used as parameters of the speed change function $\Delta F = f(\Delta I, \Delta Pc, \Delta Pe, \Delta t)$. The coefficients for the parameters can also be weight factors, having compressor current change of $\Delta I$ as $A_1$, refrigerant high pressure change of $\Delta Pc$ as $A_2$, refrigerant low pressure change of $\Delta Pe$ as $A_3$, as well as the change of time $\Delta t$ since compressor is on as $A_4$. These parameter weights each could be between 0% to 100%, but should satisfy $A_1+A_2+A_3+A_4=100\%$.

Figure 11:
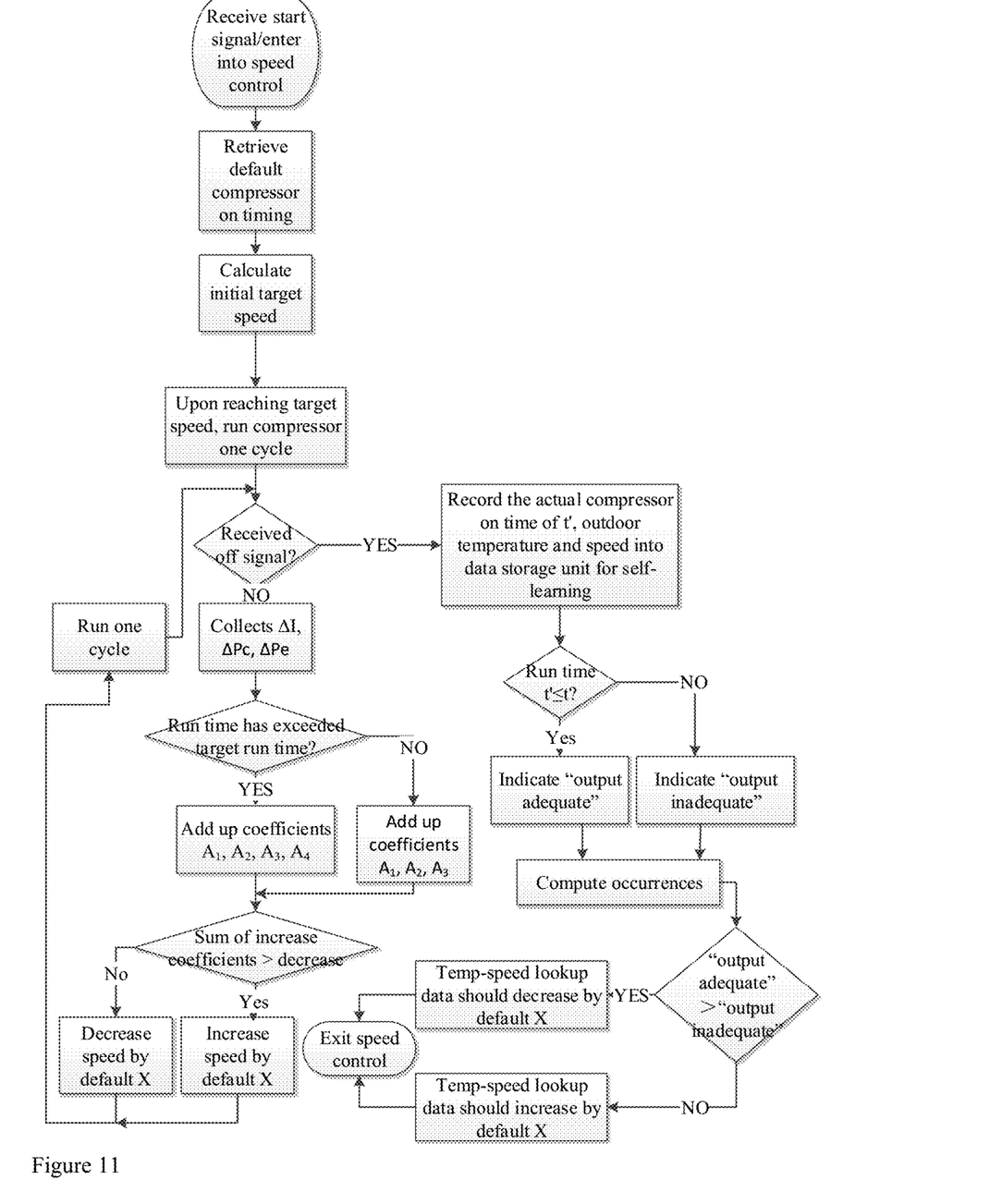
FIG. 11 shows a flow diagram of the new variable AC unit implementation of a fifth embodiment of this disclosure.

FIG. 11 shows a flow diagram of a new fuzzy control method in the present disclosure comprises:

a. receiving default setting of run time t, and the compressor regression model parameters on compressor current change of $\Delta I$ as $A_1$, refrigerant high pressure change of $\Delta Pc$ as $A_2$, refrigerant low pressure change of $\Delta Pe$ as $A_3$, as well as the change of time $\Delta t$ since compressor is on as $A_4$;
b. based on the outdoor temperature and the default run time t, setting a target compressor speed;
c. running compressor until the target compressor speed is achieved, then running it one speed control timing cycle;
d. based on only compressor current change of $\Delta I$, calculating the value of this parameter that either would favor increase speed or decrease speed;
e. based on only refrigerant high pressure change of $\Delta Pc$, calculating the value of this parameter that either would favor increase speed or decrease speed;
f. based on only refrigerant low pressure change of $\Delta Pe$, calculating the value of this parameter that either would favor increase speed or decrease speed;
g. when the current time has not reached the target run time t, then adding up all the favorable values of the parameters of $A_1$, $A_2$ and $A_3$ that would increase compressor speed, as well as adding up all the favorable values of the parameters that would decrease compressor speed, and based on the increase of compressor speed sum value>decrease of compressor speed sum value, setting the compressor value higher—or lower conversely;
h. when the current time has reached the target run time t, then adding up all the favorable values of the parameters of $A_1$, $A_2$, $A_3$ and $A_4$ that would increase compressor speed ($A_4$ being a parameter always favors increasing speed), as well as adding up all the favorable values of the parameters that would decrease compressor speed, and based on the increase of compressor speed sum value>decrease of compressor speed sum value, setting the compressor value higher—or lower conversely;
i. running the compressor one speed control timing cycle before returning to step d;
j. when receiving compressor off signal, recording the actual compressor on time of t', actual average outdoor temperature and actual average speed from the compressor on period into data storage unit for self-learning purpose, and denoting that when t'≤t, the actual speed as "adequate", or "inadequate" when t'>t;
k. further processing the multiple events on speed setting within a given temperature in the data storage, so that statistically, when actual speed "adequate" occurrence>"inadequate" occurrence, decreasing the default speed for a given temperature by default X, or increasing conversely.

The invention claimed is:
1. A fixed speed conversion to variable speed AC (meaning both cooling and heating) control method for speed control in AC system being fully compatible with existing fixed speed AC control system using only on and off signaling communication between outdoor unit and indoor unit, without any wire to obtain a room temperature and a set temperature, comprising:
Step 1 receiving default setting of run time t, based on current outdoor temperature and the default run time t, setting a target compressor speed;
Step 2 obtaining three parameters and their coefficients of compressor regression model from compressor current change of ($\Delta I$) as ($A_1$), refrigerant high pressure change of ($\Delta Pc$) as ($A_2$), refrigerant low pressure change of ($\Delta Pe$) as ($A_3$), in conjunction with change of time ($\Delta t$) since at recorded speed compressor is run as ($A_4$), wherein the compressor speed regression model format is $((\Delta F)=f((A_1)(\Delta I), (A_2)(\Delta Pc), (A_3)(\Delta Pe), (A_4)(\Delta t))$ and;

wherein $(\Delta I)=(I')-(I)$, $(\Delta Pc)=(Pc')-(Pc)$, $(\Delta Pe)=(Pe')-(Pe)$, $(\Delta t)=(t')-(t)$ and;

wherein I', Pc', Pe' and t' are the values of current speed control timing cycle and;

wherein I, Pc, Pe and t are the values of prior speed control timing cycle immediately preceding the current speed control timing cycle;

Step 3 running compressor until the target compressor speed is achieved, then running it one speed control timing cycle; and Step 4 based on evaluating the regression model, readjusting the compressor speed by a default setting amount wherein the readjustment is based on determining from the regression model, whether a different speed is better than the current speed in matching cooling or heating indoor load, wherein the readjustment is self-learned by observation from past operation data.

2. The variable speed AC control method according to claim 1, wherein the readjusting step evaluates the regression model by adding up the coefficient values from $(A_1)$, $(A_2)$, $(A_3)$ and $(A_4)$ that would favor increasing speed as well as decreasing speed, and based on the net value, chooses to increase or decrease the compressor speed by the default setting amount.

3. The variable speed AC control method according to claim 2, wherein the readjusting step calculates the individual coefficient values from (A1), (A2), (A3) and (A4) as weight factors that would favor increasing or decreasing compressor speed.

4. The variable speed AC control method according to claim 3, wherein the readjusting step tests whether the compressor speed is higher than the default speed, and if so, decreases the compressor speed; and the amount of increase or decrease default setting is set by user or by remote server.

5. The variable speed AC control method according to claim 4, further comprising:

Step 5 after operation cycle is finished, testing whether the operation cycle is completed ahead of the target timing, and based on comparing similar multiple operation cycle performances, determining whether the similar operation cycle speed should be increased or decreased by default setting, and recording operation cycle parameters into a database.

6. A non-transitory computer-readable medium having stored thereon a set of computer-executable instructions for causing a fixed speed conversion to variable speed AC (meaning cooling or heating) control system being fully compatible with existing fixed speed AC control system using only on and off signaling communication between outdoor unit and indoor unit to perform steps without wire to obtain a room temperature and a set temperature, comprising:

Step 1 receiving default setting of run time t, based on current outdoor temperature and the default run time t, setting a target compressor speed;

Step 2 obtaining three parameters and their coefficient(s) of compressor regression model from compressor current change of $(\Delta I)$ as $(A_1)$, refrigerant high pressure change of $(\Delta Pc)$ as $(A_2)$, refrigerant low pressure change of $(\Delta Pe)$ as $(A_3)$, in conjunction with of time $(\Delta t)$ since at recorded speed compressor is run as $(A_4)$, wherein the compressor speed regression model format is $((\Delta F)=f((A_1)(\Delta I), (A_2)(\Delta Pc), (A_3)(\Delta Pe), (A_4)(\Delta t)$ and;

wherein $(\Delta I)=(I')-(I)$, $(\Delta Pc)=(Pc')-(Pc)$, $(\Delta Pe)=(Pe')-(Pe)$, $(\Delta t)=(t')-(t)$ and;

wherein I', Pc', Pe' and t' are the values of current speed control timing cycle and;

wherein I, Pc, Pe and t are the values of prior speed control timing cycle immediately preceding the current speed control timing cycle;

Step 3 running compressor until the target compressor speed is achieved, then running it one speed control timing cycle; and Step 4 based on evaluating the regression model, readjusting the compressor speed by default setting amount wherein the readjustment is based on the regression model, whether a different speed is better than the current speed in matching cooling or heating indoor load, wherein the readjustment is self-learned by observation from past operation data.

7. The non-transitory computer-readable medium according to claim 6, wherein the readjusting step evaluates the regression model by adding up the coefficient values from (A1), (A2), (A3) and (A4) that would favor increasing speed as well as decreasing speed, and based on the net value, chooses to increase or decrease the compressor speed by the default setting amount.

8. The non-transitory computer-readable medium according to claim 7, wherein the readjusting step calculates the individual coefficient values from (A1), (A2), (A3) and (A4) as weight factors that would favor increasing or decreasing compressor speed.

9. The non-transitory computer-readable medium according to claim 8, wherein the readjusting step tests whether the compressor speed is higher than the default speed, and if so, decreases the compressor speed; and the amount of increase or decrease default setting is set by user or by remote server.

10. The non-transitory computer-readable medium according to claim 9, further comprising:

Step 5 after operation cycle is finished, testing whether the operation cycle is completed ahead of the target timing, and based on comparing similar multiple operation cycle performances, determining whether the similar operation cycle speed should be increased or decreased by the default setting, and recording operation cycle parameters into a database.

\* \* \* \* \*